(12) United States Patent
Sabree et al.

(10) Patent No.: US 9,044,379 B2
(45) Date of Patent: Jun. 2, 2015

(54) CUSTOM MOLDED NIPPLE REPLICATING A HUMAN NIPPLE FOR USE IN BOTH PACIFIERS AND BABY BOTTLES

(76) Inventors: Luvina Sabree, Ft. Hood, TX (US);
LaShawna Heflin, Killeen, TX (US)

( * ) Notice: Subject to any disclaimer, the term of this patent is extended or adjusted under 35 U.S.C. 154(b) by 606 days.

(21) Appl. No.: 11/078,784

(22) Filed: Mar. 11, 2005

(65) Prior Publication Data

US 2006/0201901 A1    Sep. 14, 2006

(51) Int. Cl.
*A61J 17/00* (2006.01)
*A61J 11/00* (2006.01)
*B29C 33/38* (2006.01)

(52) U.S. Cl.
CPC ............... *A61J 17/00* (2013.01); *A61J 11/005* (2013.01); *B29C 33/3885* (2013.01)

(58) Field of Classification Search
CPC ..... A61J 17/00; A61J 11/005; B29C 33/3885
USPC ........... 606/234–236; 264/222, DIG. 30, 645; 215/11.1; 128/898
See application file for complete search history.

(56) References Cited

U.S. PATENT DOCUMENTS

| | | | |
|---|---|---|---|
| 3,923,067 A | 12/1975 | Hurst | |
| 4,247,351 A * | 1/1981 | Rechenberg | 156/221 |
| 4,249,975 A * | 2/1981 | Rechenberg | 156/245 |
| 5,108,686 A * | 4/1992 | Griffin | 264/222 |
| 5,300,089 A | 4/1994 | Sassin | |
| D381,752 S | 7/1997 | McCoy | |
| 5,653,732 A * | 8/1997 | Sheehy | 606/236 |
| 5,693,164 A * | 12/1997 | Chang | 156/152 |
| 5,824,075 A * | 10/1998 | Thielbar | 623/7 |
| D404,825 S | 1/1999 | Reed | |
| 5,904,746 A * | 5/1999 | Okada | 65/66 |
| 6,161,710 A | 12/2000 | Dieringer et al. | |
| 6,669,064 B2 | 12/2003 | Perricone | |
| 6,736,830 B2 * | 5/2004 | Roust | 606/234 |
| 7,058,439 B2 * | 6/2006 | Eaton et al. | 600/425 |
| 8,086,336 B2 * | 12/2011 | Christensen | 700/98 |
| 2004/0073305 A1 * | 4/2004 | Schneider-Nieskens | 623/7 |
| 2004/0143326 A1 * | 7/2004 | Holmes | 623/7 |

FOREIGN PATENT DOCUMENTS

DE           3232506           3/1984

OTHER PUBLICATIONS

PCT, written opinion of ISA, PCT/US2006/007648.

* cited by examiner

*Primary Examiner* — Darwin Erezo
*Assistant Examiner* — Diane Yabut
(74) *Attorney, Agent, or Firm* — Flener IP Law; Zareefa B. Flener

(57) ABSTRACT

A customized nipple for a pacifier or baby bottle which is provided with a method for molding an exact non-toxic material replica of the mother's breast, nipple, and areola area from a mold so that when the replica is filled with a non-toxic gel-like substance and adhered to a backing, the pacifier so created has the firmness, color, rigidity, and texture of the mother's natural breast, nipple, and areola area. Further, the simple to use mold is sent to a core facility which stores the identifying information with the mold once a first pacifier is created therefrom. Moreover, the mother can re-order or re-make the pacifier as needed over time. The pacifier so provided is a safe and effective pacifying device which promotes good emotional, muscular, and bone structure development for the baby, and at the same time, provides the mother with confidence and independence.

18 Claims, 12 Drawing Sheets

US 9,044,379 B2

CUSTOM MOLDED NIPPLE REPLICATING A HUMAN NIPPLE FOR USE IN BOTH PACIFIERS AND BABY BOTTLES

FIELD OF THE INVENTION

The present invention relates to the field of pacifiers and bottles, and more particularly those that have a customized molding and backing that can be used in conjunction with either a pacifier backing element, a bottle, or a nipple ring.

BACKGROUND OF THE INVENTION

Currently, in the marketplace, there are available a wide variety of pacifiers designed to sooth a baby. Oftentimes, a baby rejects a pacifier because it is only familiar with its mother's nipple and areola area. By the same token, once a baby has accepted a pacifier nipple, the baby may reject the mother's breast. Over the years, mother's have been fraught with the dilemma of whether to transition a baby to a pacifier and whether nipple confusion can be overcome once a pacifier is introduced. No mother wants to experience having her breast rejected by her most precious and dependent baby, but on the other hand, some women do at times suffer from the discomfort of having cracked and bleeding nipples from her baby being placated on the mother's nipple. Further, alternate means of nursing would be highly desired while the mother has a breast infection or mastitis, which renders the breasts sore to the point of being nearly untouchable. Also, for all nursing mothers, and particularly working nursing mothers, it would be highly desirable to provide an alternative means for non-nutritive sucking and for feeding while infant and mother are separated. An exact replication of the mother's breast will also promote bonding for the non-nursing mother, or a mother who is unable to nurse, and for the father and other family members.

It is widely known that mother's milk is the best formulation for infant nutrition, and that breast feeding provides a method which nourishes the infant while also enhancing the health and well being of the infant.

Another concern associated with babies who use pacifiers, is the inaccurate development of the jaw and teeth. Pacifiers can affect the normal shape of the soft and hard palate. Factors such as the shape and size of the pacifier, and the amount of sucking force that is used, will determine the amount of deformation that can occur. By using a pacifier molded from the mother's breast, a baby is less likely to develop an unnatural bite, and will instead, develop correct facial muscle growth which is essential to ensure proper teeth alignment, and soft and hard palate development. Although inventors have ingeniously devised various means to provide a pacifying device to an infant, most of these items involve a nipple that is foreign to the contour, color, and texture of the mother's natural nipple.

In reviewing the prior art, there are a number of pacifiers that have, in one way or another, been developed to simulate a mother's nipple but none disclose a pacifier which is an exact replica thereof. For example, U.S. Pat. No. 5,108,686, issued to Griffin, provides a nipple and a method for manufacturing the nipple. The device comprises a nipple molded directly from the mother's breast which is mainly intended to be used for a bottle. The Griffin patent also discloses, however, a nipple for use with a pacifier but the disclosure provided does not reveal a pacifier intended to replicate the rigidity and firmness of a mother's natural nipple and areola for suckling. Further, the method from which the device is made consists of a mold which, when pressed to the mother's breast, leaves an imprint which creates a negative mold from which a positive mold is taken, and any material, liquid or plastic, suitable for a baby including latex, is deposited between the negative and positive mold, which when set, creates the nipple device. The disclosure also contemplates using different materials for the nipple and the breast so that the natural breast's rigidity can be created including textures. However, when the mold is mounted to a pacifier backing, it is apparently squished in side configuration, which is not a desired replication form for a mother's natural breast shape.

The next patent is U.S. Pat. No. 5,653,732, issued to Sheeby, is also directed at a nipple for a bottle. The Sheeby patent discloses a natural formed nipple for a bottle with a mouthpiece constructed such that the nipple is integral with the securing structure, has three small holes or apertures for dispensing milk there through, and has ridges or grooves along the mouthpiece at intervals along the surface from the teat, at one end, to the securing device, at the other. Further, the Sheeby device reveals that the mouthpiece should be fabricated out of a pliable latex material. A woman's natural breast is devoid of the three ridges found in the Sheeby device and therefore it does not correctly replicate a woman's breast.

U.S. Pat. No. 6,161,710, issued to Dieringer, also discloses a feeding device which trains an infant to latch on to a simulated nipple and suckle to produce milk. The device includes a wide detachable inner and outer membrane with a nipple at one end creating a nipple apparatus which has a base that is wider than the standard bottle to which it will be affixed. If the infant correctly latches onto and suckles the nipple device, the outer membrane comes into contact with the inner membrane so that the flow of fluid is facilitated through the membranes and out of the nipple. The Dieringer patent also discloses that the outer membrane can be molded directly from the mother's nipple so that the shape, outer surface, texture, and color of the nipple are a replica of the mother's breast. Further, the Dieringer device indicates that the nipple apparatus can be affixed onto a bottle via an adaptor contemplated to compliment several different bottle types and shapes. The present invention, unlike the Dieringer device, does not require an inner and outer membrane.

One relatively recent patent, U.S. Pat. No. 6,669,064 B2, issued to Perricone discloses yet another feeding device that simulates breast feeding and can be worn by a person across the shoulder. The feeding container comprises a housing portion intended to represent a nipple, containing a collapsible bag within that can deliver milk or other fluids through the nipple portion which protrudes through the housing portion. The feeding container has straps opposing the nipple end which present a loop interface which can either be coupled to a corresponding area on a shoulder strap, or can be slidingly received by a hand.

Another patent, U.S. Pat. No. 6,736,830 B2, issued to Roust, discloses a pacifier device that has a bell shaped flexible body portion with a nipple portion at one end, and at the other end, the body portion is attached to a somewhat rigid base with a handle end opposing the nipple portion. Further, the Roust device discloses a two layered wall construction which can be made of sanoprene and includes a viscous layer between the inner wall and rigid base.

Other patents disclose designs only intended to simulate breast feeding, rather than a method for making a natural, customized, and personalized nipple for a pacifier and device directed thereto. One such patent, U.S. Pat. No. Des. 404,825, issued to Reed discloses an ornamental design for a simulated breast baby bottle, wherein a breast portion is attached to a bottle. But the nipple disclosed therein does not in any manner, shape or form, resemble a natural woman's breast. A second design, U.S. Pat. No. Des. 381,752, issued to McCoy, is an ornamental design for a nurser that is intended to fit over a mother's breast and nipple with holes through which the nursing infant can receive milk when suckling.

Thus, nowhere in the prior art is seen a pacifier or infant bottle with a reproduction of a woman's breast wherein the method for making the device includes a personalized mold of the mother's breast from which a personalized custom nipple can be created to be affixed to either a pacifier or an infant bottle which retains its configuration and rigidity through a combination of materials.

SUMMARY OF THE INVENTION

The present invention comprises both a method for making a nipple for a pacifier or/and a bottle and device resulting therefrom. The method for making the nipple comprises a molding kit, which includes a cup for containing and mixing the molding material, and labeling provisions. The molding material can be made of any casting material which is non-toxic, washable, hypo-allergenic, and particularly provided for intimate contact with skin without leaving any residue including acrylic materials. Once the mother's breast is prepared and the molding material mixed, the molding material in the cup can be imprinted from the left or right breast, leaving an impression of the nipple, areola, and part of the breast, thus creating a negative mold. Identification provisions may include questions for detailed identification of the mother, the breast to be copied, and the negative mold thus made.

The negative mold is sent to a core facility, where the negative mold and information pertaining thereto is archived. Further, from the negative mold is created a positive mold. The positive and negative mold are pieced together with a casting material which, when removed, provides a cavity. The positive mold can be made with a channel provided from the upper and lower surface for delivery of a non-toxic material, silicone, sanoprene, or other liquid, copolymeric or plastic suitable for use in a baby's nipple. The non-toxic material can be provided in steps to further provide the opportunity for different textures, thickness of material, rigidity, and color for the ultimately created nipple for a pacifier. Additionally, the nipple can be made from a low pressure urethane material injected into the negative mold. Another possible material for creating the nipple would include an ultra violet curable acrylic material. Ultimately, the nipple should be made from a hypo-allergenic, latex free, FDA approved, bacteria free material.

Once the nipple is created, it is filled with a non-toxic, anti-bacterial gel or other filler, including water, which provides firmness and elasticity. In another preferred embodiment, different portions of the constructed breast like nipple can be filled with gels of different thickness providing differing rigidity throughout the device to more closely emulate the mother's natural nipple area. The nipple is then sealed with a backing with the gel or other filler inside providing a replica of the mother's natural breast nipple and areola area.

In an additional preferred embodiment, each layer of the gel is sealed separately, or layered to prevent the different fillers from mixing. The backing can have a handle or not as desired. The backing of the nipple can be closed, thereby containing the filler, in one preferred embodiment by stretching the soft pliable nipple material over a backing and sealed with a glue or bonding agent. In another preferred embodiment the nipple can be provided with additional material at the outer periphery which can be stretched over the rim of a backing so that when it needs replacing, the mother can simply reuse the backing, dispose of the nipple, and reorder the nipple from the mold already archived at the core facility.

In yet another preferred embodiment, the additional material provided at the periphery of the nipple can be stretched over the backing which is provided with a post. The pacifier, with or without a handle, can then clamp onto the post thus securing the nipple in place. In another preferred embodiment, the nipple periphery can be designed so that it has an aperture designed to receive the post which threadingly receives the pacifier to secure the nipple in place. Of course, alternative methods of supporting the shape of the nipple may be utilized to achieve the desired results. Additionally, the nipple configuration utilized in the baby bottle top may consist of a molded replication nipple which has an interior space suitable for filling with a non-toxic liquid gel to provide further resemblance to the texture and feel of a nursing breast. Although the preferable method of nursing and suckling a baby is with the mothers actual breast, ultimately, the present invention provides a hands free alternative means for pacifying a baby without the need of the mother's actual breast.

The present invention provides an alternate means of nursing when the mother has a breast infection or mastitis, which renders the breasts sore to the point of being nearly untouchable. An alternate means is also available to all mothers, and particularly to working nursing mothers, to provide non-nutritive sucking and for feeding while infant and mother are separated. Additionally, the present invention provides a means for mothers who are unable to nurse and other family members to bond with the baby by providing a nipple custom molded from the mothers breast for nursing.

The foregoing disclosure taken together with other features and advantages of the present invention can be readily derived from the following detailed description of the drawings taken in conjunction with the accompanying drawings present herein, and should be considered as within the overall scope of the invention.

OBJECTS OF THE INVENTION

Thus, it is one primary object of the present invention to provide a custom molded nipple for a pacifier which mimics the contour, size, texture, color, and firmness of a mother's natural nipple and areola area of the breast.

It is yet an additional primary object of the present invention to provide a custom molded nipple for a pacifier which enables the mother to pacify her baby remotely.

It is still a further primary object of the present invention to provide a custom molded nipple for a pacifier which is an exact replica of the mother's breast giving the mother confidence that her baby will not be confused by an alien object in her mouth.

Yet a further primary object of the present invention to provide a custom molded nipple for a pacifier which is an exact replica of the mother's breast, giving the non-nursing mother an opportunity to be a part of the baby's placation and physical development.

Another primary object of the present invention is to provide a custom molded nipple for a pacifier which is an exact replica of the mother's breast which when suckled provides sufficient elasticity and rigidity to prevent abnormal muscular facial and palate development.

Additionally, it is a primary object of the present invention to provide a custom molded nipple for a pacifier which placates the baby and gives the mother more independence.

Still another primary object of the present invention is to provide a method for making a custom molded nipple for a pacifier which can be stored for easy and inexpensive replacement orders.

Another primary object of the present invention is to provide a method for making a custom molded nipple for a pacifier which catalogues the mother's information for quick and easy retrieval of the information.

Yet another primary object of the present invention is to provide a method for a custom molded nipple for a pacifier, and/or bottle, which can easily be renewed with a new mold as time alters the nipple and areola of the mother's breast.

These and other objects and advantages of the present invention can be readily derived from the following detailed description of the drawings taken in conjunction with the accompanying drawings present herein and should be considered as within the overall scope of the invention.

DETAILED DESCRIPTION OF THE DRAWINGS

Figure 1:
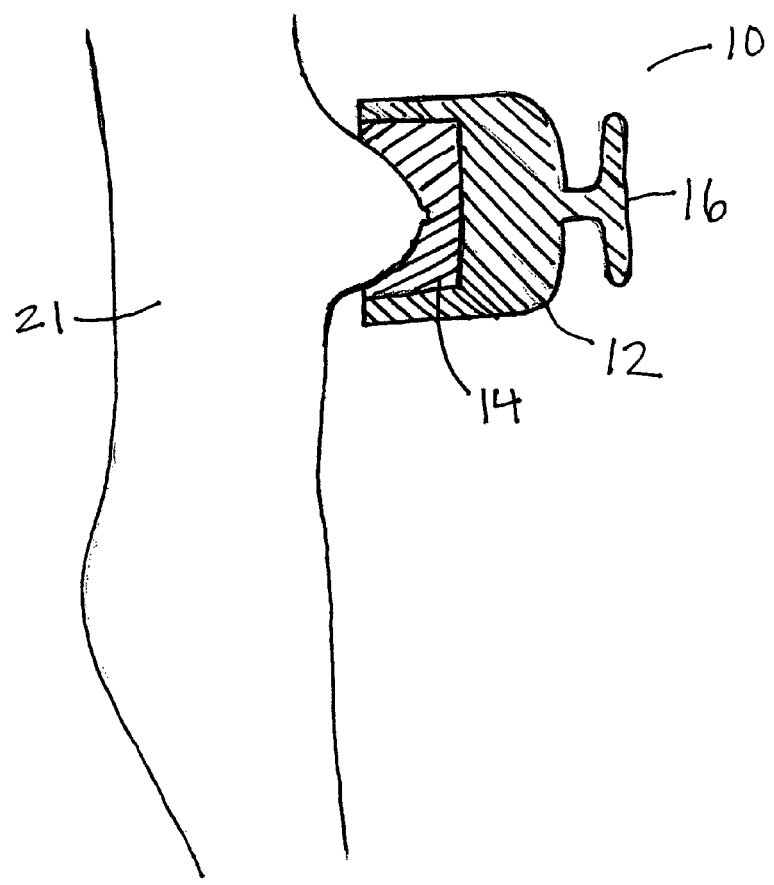
FIG. 1 is a side elevational cross sectional view of one embodiment of the present invention showing the method for molding the mother's prepared breast, nipple, and areola.

Shown now in FIG. 1 is a side elevational view of a woman's body 21 and a partial elevation in cross section of the present invention for making a mother's nipple area replication, or molding assembly 10, which includes a container 12 for the negative molding material 14. The container 12 has an ergonomic grip portion 16 which can be easily and comfortably handled and held in place for a period of time while molding material 14 in molding assembly sets up. The grip portion 16 can be configured to any shape which is comfortable to hold. The negative molding material 14 can be made from any non-toxic latex free material such as: silicone, sanoprene, a copolymeric material, or any other material which can be safely used in a nipple for a baby. The container 12 may likewise be created from a urethane material or an ultra violet acrylic material, which hardens upon exposure to an ultra violet light which can be provided in the molding kit.

Figure 2:
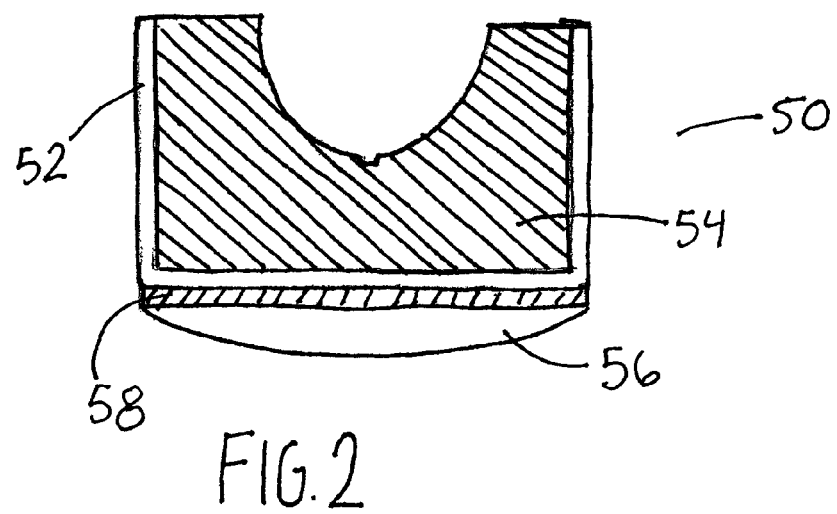
FIG. 2 is a side elevational view of one preferred embodiment of the present invention the cross section of the container of the present invention.

FIG. 2 illustrates another side elevational view of a preferred embodiment of the present invention, negative mold assembly 50 wherein an elevated cross sectional view of the container 52 for the negative molding material 54 is depicted with a detachable grip portion 56 so that the grip portion 56 can be detached after the breast imprint is created in the negative molding material 54, so that the container 52 may be placed flat on a surface for convenience in handling. Of course, a removable securement means, shown as layer 58, may consist of one or more of the following commonly available fastening means known and readily available in the art: miniature hook and loop fasteners, sticky putty or tacky materials, removable adhesives and the like.

Figure 3:
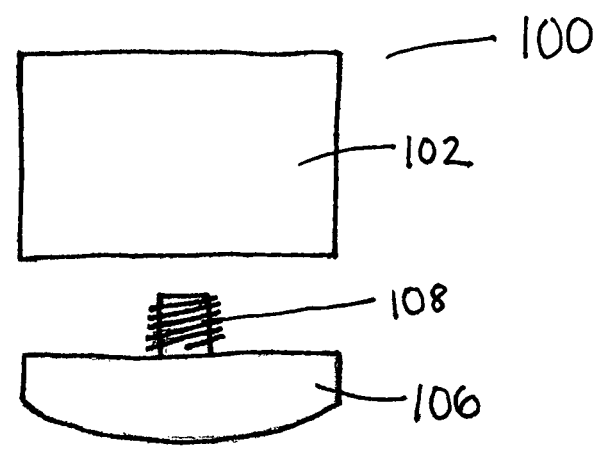
FIG. 3 is a side elevational view of the container of one preferred embodiment of method for making the present invention with a removably attachable base portion.

FIG. 3 illustrates is a side elevational view of the container 102 for the present invention, mold assembly 100 containing a threaded bore in the base of housing 102 which is adapted to removably and threadingly receive a grip portion 106, wherein the grip portion 106 is provided with a protruding bolt 108 containing exterior threads. In such a manner, this configuration of the present invention allows the grip portion 106 to be readily attached or detached from housing 102 when not in use.

Figure 4:
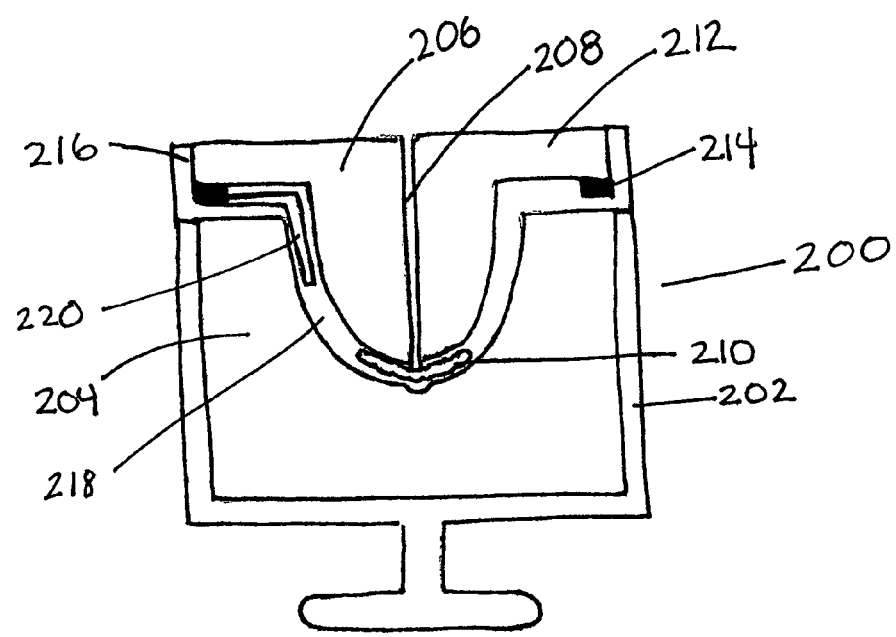
FIG. 4 is a side elevational view of the cross section of one preferred embodiment of the container of the method for making the present invention.

FIG. 4 illustrates another side elevational cross section of a preferred embodiment of the present invention, negative molding assembly 200 wherein the container 202 is lined with the negative molding material 204 which is then set with a positive mold 206 and appropriate techniques are employed to ensure efficient separation of the negative 204 and positive 206 molds. Both molds may be created from a two part urethane pattern. The positive mold 206 is further provided with a channel 208 through which the non-toxic, bacteria free, hypo-allergenic material 210 for the nipple and areola portion of the pacifier can be delivered to a cavity 218. The non-toxic material 210 may be provided with different colors, textures, rigidity, and thickness for a more accurate replica of the mother's breast. Further, the positive mold 206 has a first and second portion 212 which is in contact with the platform 214 of a slidably adjustable slide 216. Moreover, the non-toxic material may be delivered to the cavity 218 in increments from either the channel 208 or through tubes inserted through any one of a multitude of apertures along the length of the slides 216. In this particular embodiment, a tube 220 is depicted in the cavity 218 which can be inserted through an aperture in the slide 216 through which the non-toxic material 210 may be delivered in increments. It is also contemplated that a low pressure urethane reaction injection mold be injected into the negative mold to thereby create the nipple.

Figure 5:
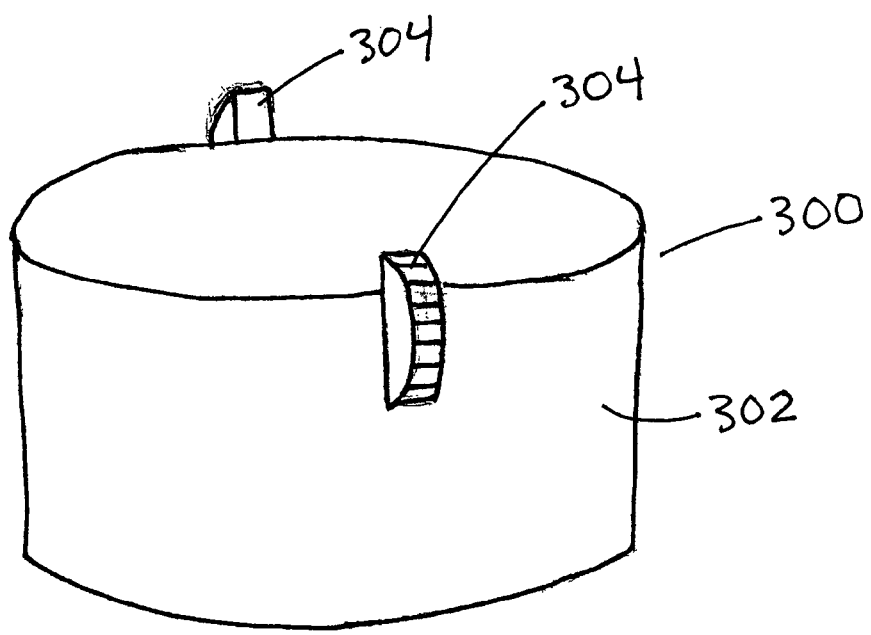
FIG. 5 is a top perspective view of a preferred embodiment of the method for making the present invention.

FIG. 5 shows a side perspective view of another preferred embodiment of the container 302 of the present invention, mold assembly 300. It is further contemplated that the container 302 can be fitted with two slides 304 opposing one another at equal distances. Each slide 304 can slidingly receive a platform from which the positive mold can be suspended.

Figure 6:
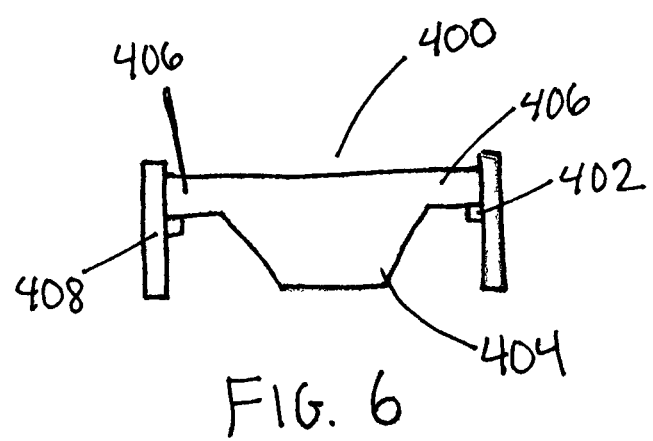
FIG. 6 is a side elevation view of a preferred embodiment of the method for making the present invention having a platform and slides for adjusting the distance between the molds.

FIG. 6 shows a side elevational broken away view of the slides 402 of the present invention, mold assembly 400 wherein the positive cast 404 is detachably suspended from the slides 402. The positive cast 404 has a first and second portion 406 which can be removably received by the platform 408 traversably resting on the slides 402. By traversing the length of the slides 402 the platform 408 can adjust the distance between the positive and negative casts providing for different thickness of the material 210, of FIG. 4. Further, the slides 402 may be either manually adjusted, or digitally adjusted. It is also contemplated that a scanning technique of the mother's breast can be utilized to digitally create a positive and negative mold via a computer direct account of the nipple. This information could then be sent over the internet to the core facility for molding of the nipple area replica.

Figure 7:
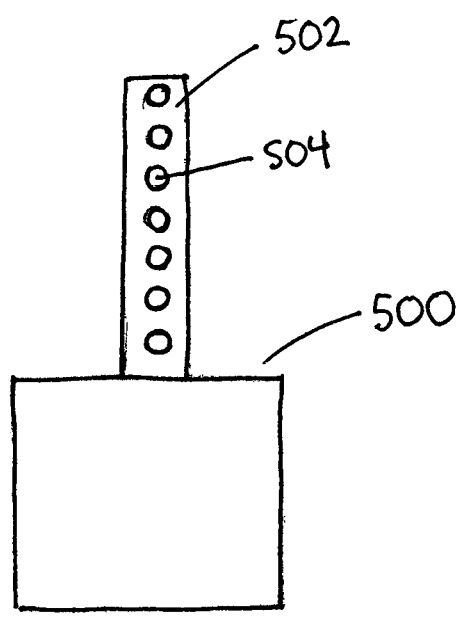
FIG. 7 is a side elevation view of a preferred embodiment of the method for making the present invention wherein the container has attachable slides.

FIG. 7 shows a side elevational view of a slide 502 of the present invention, mold assembly 500 with a plurality of apertures 504 provided through which the non-toxic material may be delivered in increments along the cavity to create the nipple and areola portion for the mold assembly 500.

Figure 8:
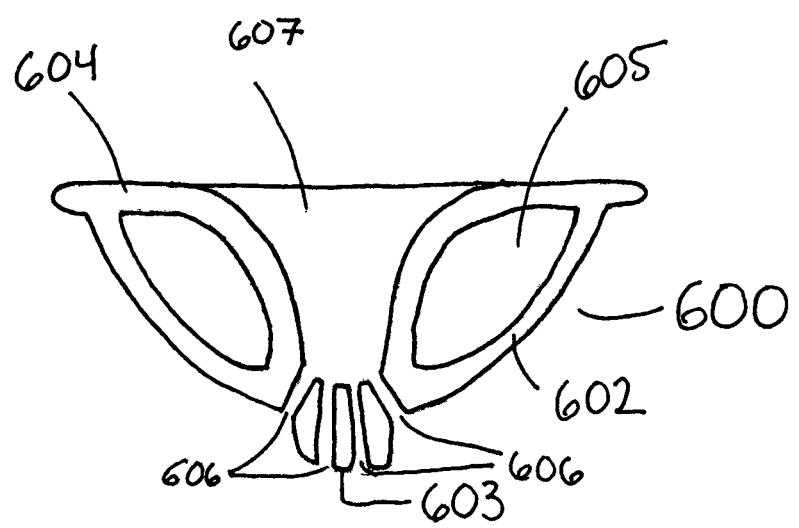
FIG. 8 is a side elevational cross section view of a preferred embodiment of the present invention.

FIG. 8 depicts a side elevational cross section view of the present invention, molded nipple area replication 600 with a body 602 made of non-toxic material and filled with a non-toxic, bacteria free gel 605 or any other filler which may be used to maintain the shape and thickness of the true mother's breast including water; a nipple portion 603 at one end through which there is provided a plurality of fluid dispensing apertures 606, and a backing portion 604 adjacently adhered to the body 602 opposing the nipple portion 603. Of course, when the nipple is used as a pacifier, internal cavity 607 may be completely filled with a non-toxic gel or other soft fluid like material.

Figure 9:
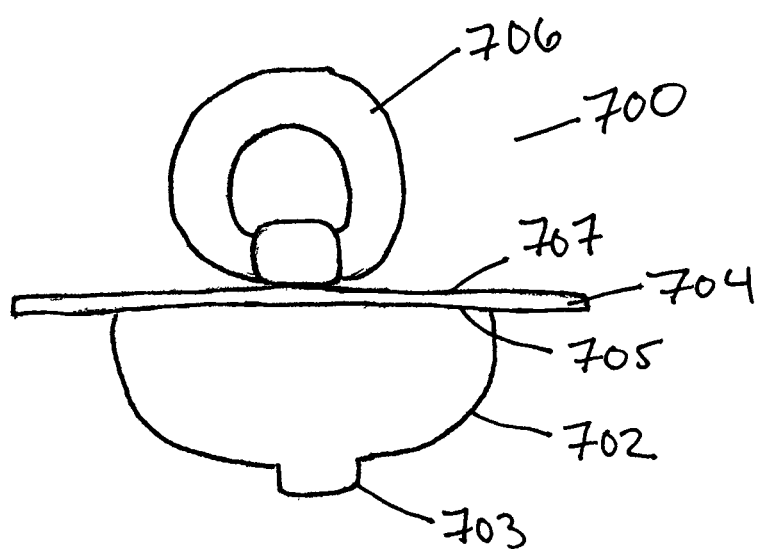
FIG. 9 is a side elevational view of a preferred embodiment of the present invention wherein the backing has a handle.

FIG. 9 illustrates a side elevational view of the present invention, nipple area replication device 700 with a body 702 and a nipple portion 703 opposing a backing portion 704 adhered to the body 702 along a body side 705. In this particular preferred embodiment, the backing portion 704 is provided with a handle 706 on the exterior side 707 which opposes the body side 705 of the backing 704.

Figure 10:
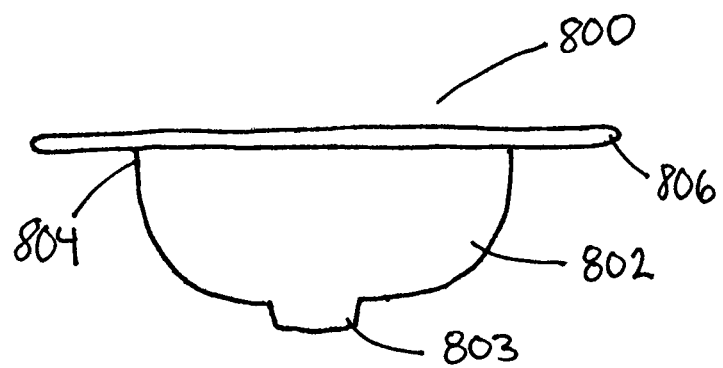
FIG. 10 is a side elevation view of a preferred embodiment of the present invention.

FIG. 10 is a side elevational view of the present invention, nipple area replication device 800 with a body portion 802, a nipple portion 803, and a backing portion 806. The body portion 802 is provided with an elongated periphery 804 which is securely removably attached to the backing portion 806 to provide a secure and immovable fit. In this particular embodiment, the present invention, nipple area replication device 800 can be removed from the backing portion 806 and discarded when old, and the backing can be reused with a reordered nipple portion 803. Body portion may be removably secured to backing portion with a non-toxic adhesive that may be forcibly separated from backing portion 806, or other common removable securement means in the art may be utilized.

Figure 11:
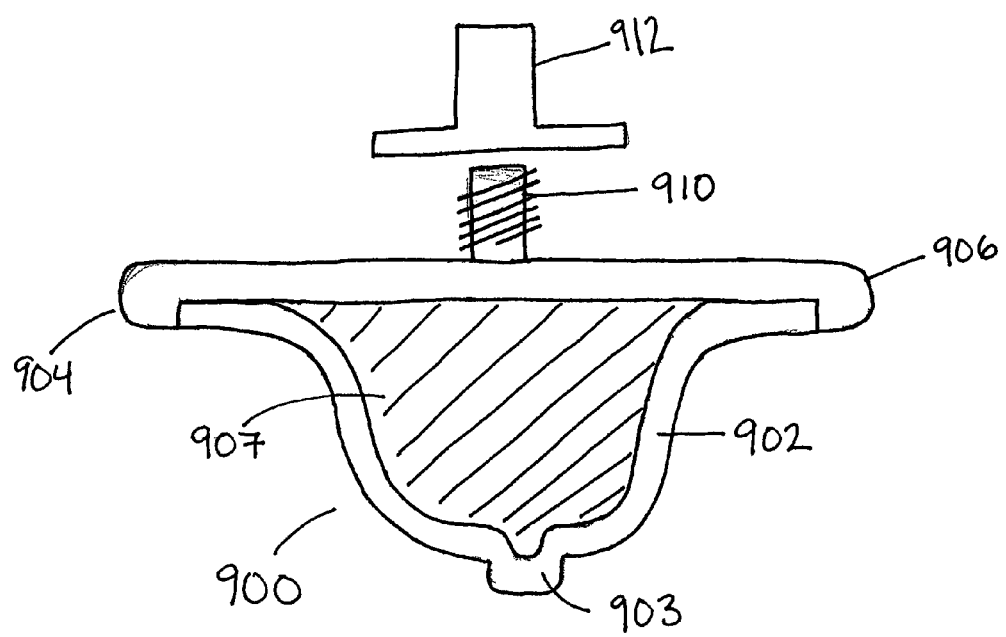
FIG. 11 is a side elevation blown apart view of a preferred embodiment of the present invention.

FIG. 11 is a side cross section elevational view of the present invention, nipple area molded assembly 900 with a body portion 902, nipple portion 903, and a backing portion 904. The body portion 902 is provided with an elongated periphery 906 with at least one aperture which can be removably retained by a threaded bolt 910 located on the backing portion 904. The threaded bolt 910 can then either snap onto a housing 912, or as in this particular embodiment, threadingly receive the housing 912, thereby removably securing nipple area molded assembly 900 thereto. Further, the housing 912 may be provided with a handle, when desired by the user. In this particular embodiment, the housing 912 has not been provided with a handle. However, a soft, gel like or putty like substance has been added to the interior chamber 907 of body portion 902 to provide softness, comfort and are more natural comforting feeling to the infant's mouth. The addition of gel or putty to the interior of the present invention will also provide the necessary resistance to enhance tooth, gum and jaw development, as occurs during natural nursing of an infant.

Figure 12:
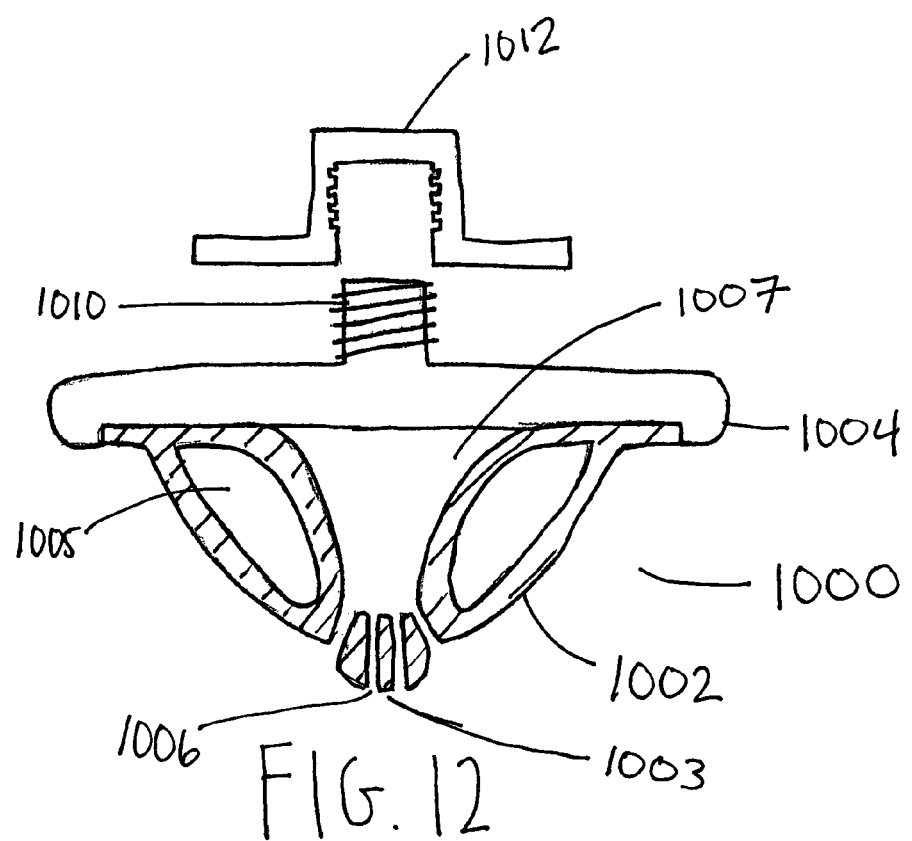
FIG. 12 is a side elevational cross sectional view a preferred embodiment fo the present invention.

FIG. 12 is a side elevational cross sectional view of the present invention, molded nipple area replication 1000 with a body 1002 made of non-toxic material and filled with a non-toxic bacteria free gel 1005 or any other filler which may be sued to maintain the shape and thickness of the breast, including water; a nipple portion 1003 at one end through which there is provided a plurality of fluid dispensing apertures 1006, a backing portion 1004 adjacently adhered to the body 1002 opposing the nipple portion 1003. The backing portion 1004 in this preferred embodiment can be removably attached to the body 1002 if the user prefers to use the body 1002 as a pacifier rather than a bottle nipple. In this preferred embodiment the body 1002 is provided with an elongated periphery with at least one aperture which can be removably retained by a threaded bolt 1010 which can either snap onto the housing 1012, thereby removably securing the nipple area molded assembly 1000 thereto and expressing any residual air out of the internal cavity 1007. The housing 1012 can be provided with either a handle or not. The backing portion 1004, bolt 1010, and the housing 1012 can be composed of any non-toxic, bacterial free material including plastic, rubber, urethane, acrylic, sanoprene, or any other material known to be safe for use in bottles or pacifiers.

Although in the foregoing detailed description the present invention has been described by reference to various specific embodiments, it is to be understood that modifications and alterations in the structure and arrangement of those embodiments other than those specifically set forth herein may be achieved by those skilled in the art and that such modifications and alterations are to be considered as within the overall scope of this invention.

We claim:

1. A system for making a nipple for an infant sucking device comprising:
    a molded nipple area replication comprising:
        a body with an interior portion entirely enclosed by the body wherein the body is composed of a non-toxic bacteria free material;
        a first portion having a first side and an opposing second side; and
        a second portion having a nipple side and a backing side wherein the first portion has a different rigidity and texture than the second portion, the first portion has a nipple-like protrusion on the first side, the nipple side of the second portion is opposing and integral to the second side of the first portion, the backing side of the second portion is configured to removably retain an optional backing, and the interior portion entirely enclosed by the body defines a space that is filled with a non-toxic, bacterial-free filler sealed within an internal cavity so that any optional backing cannot come into contact with a gel-like substance which provides additional rigidity to the body;
    a negative mold assembly comprising:
        a container;
        a negative cast mounted within the container; and
        a slide mounted on the container and having a multitude of apertures along a length of the slide wherein each aperture is defined by a closed loop edge contained entirely on the slide and is configured to receive a tube through which the non-toxic bacteria free material is delivered;
    a positive mold assembly having a first and second portion with a channel defined there between;
    a platform interfaced between the negative and positive mold assemblies and adjustable along the length of the slide; and
    a tube inserted through one of the apertures of the slide and positioned between the negative and positive mold assemblies wherein the tube delivers therethrough the non-toxic bacterial free material of the body to a cavity between the negative and positive mold assemblies.

2. The system as claimed in claim 1, wherein the non-toxic bacterial free material of the body is composed of a material selected from one or more groups of the following non-toxic, bacteria free material; plastic, rubber, urethane, acrylic, and sanoprene.

3. The system as claimed in claim 1, wherein the first portion of said molded nipple area replication is a different color than the second portion of said molded nipple area replication.

4. The system as claimed in claim 1, further comprising a backing wherein the backing has a handle.

5. The system as claimed in claim 1, wherein the backing is composed of a material selected from one or more groups: plastic, rubber, urethane, acrylic, and sanoprene.

6. The system as claimed in claim 1, wherein the first portion of said molded nipple area replication is the same color as the second portion of said molded nipple area replication.

7. A system for making a nipple for an infant sucking device comprising;
a molded nipple area replication comprising:
a body with an interior portion having at least one part wherein the body is made of a non-toxic bacteria free material;
a backing side; and
a nipple side,
wherein the backing side has a wider circumference than the circumference of the nipple side, wherein the nipple side has a nipple-like protrusion, the body comprises two or more sections that are substantially elliptical, are adjacent to and integral with each other, and each have a different circumference, the backing side can removably retain an optional backing, and at least one part of the interior of the body is filled with a non-toxic, bacteria-free filler is sealed within an internal cavity so that any optional backing cannot come into contact with a gel-like substance entirely contained therein;
a negative mold assembly comprising:
a container;
a negative cast mounted within the container; and
a slide mounted on the container having a multitude of apertures along the length of the slide wherein each aperture is defined by a closed loop edge contained entirely on the slide and is configured to receive a tube through which the non-toxic bacteria free material is delivered;
a positive mold assembly having a first and second portion with a channel defined there between;
a platform interfaced between the negative and positive mold assemblies and adjustable along the length of the slide; and
a tube inserted through one of the apertures of the slide and positioned between the negative and positive mold assemblies that delivers therethrough the non-toxic bacteria free material of the body to a cavity between the negative and positive mold assemblies.

8. The system as in claim 7, wherein each of the sections have a different rigidity.

9. The system as in claim 7, wherein each of the sections have a different texture.

10. The system as in claim 7, wherein each of the sections have a different thickness.

11. The system as in claim 7, wherein at least one part of the interior portion is filled with the non-toxic, bacteria-free filler, and at least one part comprises at least one fluid dispensing aperture that extends the length of the body form the nipple like protrusion in the nipple side of the body through to the backing side of the body.

12. A system for making a nipple for infant sucking device comprising:
a molded nipple area replication comprising:
a body with a backing side adapted to removably receive an optional backing wherein the body is made of a non-toxic bacteria free material;
the backing side; and
a nipple side
wherein the body encases an internal cavity that extends from the nipple side to the backing side;
a negative mold assembly comprising:
a container;
a negative cast mounted within the container; and
a slide mounted on the container having a multitude of apertures along the length of the slide wherein each aperture is defined by a closed loop edge contained entirely on the slide and is configured to receive a tube through which the non-toxic bacteria free material is delivered;
a positive mold assembly having a first and second portion with a channel defined there between;
a platform interfaced between the negative and positive mold assemblies and adjustable along the length of the slide; and
a tube inserted through one of the apertures of the slide and positioned between the negative mold assemblies wherein the tube delivers therethrough the non-toxic bacteria free material of the body to a cavity located between the negative and positive mold assemblies.

13. The system as in claim 12 wherein the body is formed of a plurality of layers having different characteristics selected from the group consisting of texture, rigidity, thickness, and color.

14. The system as in claim 13 wherein each layer has different characteristics.

15. The system as in claim 13 wherein each layer has the same characteristics.

16. The system as in claim 13 wherein the backing has a handle.

17. The system as claimed in claim 12, wherein the non-toxic bacterial free material of the body is composed of a material selected from one or more groups of the following non-toxic, bacteria free material; plastic, rubber, urethane, acrylic, and sanoprene.

18. The system as in claim 12 further comprising a backing.

* * * * *